United States Patent
Sasaki et al.

(10) Patent No.: US 8,045,435 B2
(45) Date of Patent: Oct. 25, 2011

(54) OPTICAL DISC APPARATUS AND METHOD FOR WRITING DATA USING LASER BEAM

(75) Inventors: Mayumi Sasaki, Fujisawa (JP); Gohshi Jin, Kawasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 597 days.

(21) Appl. No.: 11/700,248

(22) Filed: Jan. 31, 2007

(65) Prior Publication Data
US 2007/0253299 A1 Nov. 1, 2007

(30) Foreign Application Priority Data

Apr. 26, 2006 (JP) .................................. 2006-121797

(51) Int. Cl.
*G11B 7/00* (2006.01)
(52) U.S. Cl. ..................................... 369/53.26; 369/116
(58) Field of Classification Search .................. 369/116, 369/47.53, 53.26; 372/38.01, 38.02, 38.04, 372/38.07, 38.1
See application file for complete search history.

(56) References Cited

U.S. PATENT DOCUMENTS

| | | | |
|---|---|---|---|
| 2003/0099178 A1* | 5/2003 | Sho | 369/53.26 |
| 2004/0202216 A1* | 10/2004 | Fairgrieve | 372/38.07 |
| 2006/0013091 A1* | 1/2006 | Matsuda | 369/53.1 |
| 2006/0153259 A1* | 7/2006 | Kimura et al. | 372/38.02 |

FOREIGN PATENT DOCUMENTS

| | | |
|---|---|---|
| JP | 2003-078202 | 3/2003 |
| JP | 2003-168232 | 6/2003 |
| JP | 2005-078777 | 3/2005 |
| JP | 2005-078787 | 3/2005 |
| JP | 2005-518621 | 6/2005 |
| WO | WO 03/071528 A1 | 8/2003 |

\* cited by examiner

*Primary Examiner* — Latanya Bibbins
(74) *Attorney, Agent, or Firm* — McDermott Will & Emery LLP

(57) ABSTRACT

When an optical disc apparatus of the present invention writes to an optical disc, it detects the level of the drive voltage for its laser drive circuit and, based on the detected level, adjusts the drive voltage for its laser diode so as to adjust the drive voltage for the laser drive circuit to a level within an appropriate range. Further, the write speed is also adjusted in accordance with the above adjustment of the drive voltages for the laser drive circuit and the laser diode.

4 Claims, 11 Drawing Sheets

B : I-V CHARACTERISTICS
C : I-L CHARACTERISTICS

OPTICAL DISC APPARATUS AND METHOD FOR WRITING DATA USING LASER BEAM

CLAIM OF PRIORITY

The present application claims priority from Japanese application serial No. P2006-121797, filed on Apr. 26, 2006, the content of which is hereby incorporated by reference into this application.

BACKGROUND OF THE INVENTION

1. Technical Field of the Invention

The present invention relates to an optical disc apparatus for writing data and/or reading data by use of a laser beam, and more particularly to a laser driving technique.

2. Description of the Related Art

As the write speed of an optical disc apparatus increases, its writing power must be increased, which requires an increase in the intensity of the laser beam emitted by the laser diode. This can be achieved by increasing the drive voltage applied to the laser diode. Without special arrangement, an increase in the drive voltage for the laser diode results in a reduction in the drive voltage applied to the laser drive circuit if the power supply voltage is constant. To prevent this, conventional optical disc apparatuses include a booster circuit connected between the power supply and the laser drive circuit to control the drive voltage for the laser drive circuit so that it always exceeds a predetermined level.

Prior art techniques for controlling the drive voltage for the laser drive circuit include, for example, those described in Japanese Patent Laid-Open Nos. 2003-168232 and 2003-78202. Specifically, Japanese Patent Laid-Open No. 2003-168232 discloses an optical disc apparatus adapted to maintain the intensity of its laser beam at a constant level. This optical disc apparatus includes a laser beam emitting means (or laser diode) for emitting a laser beam and a drive means (or laser drive circuit) for driving the laser beam emitting means, wherein the intensity of the laser beam emitted from the laser beam emitting means is detected and the power supply voltage of the drive means is adjusted based on the detection result. On the other hand, Japanese Patent Laid-Open No. 2003-78202 discloses a semiconductor laser drive circuit (or a laser drive circuit) for driving a plurality of semiconductor laser devices (or laser diodes) having different operating voltages one at a time. This laser drive circuit includes a power supply for generating different level power supply voltages each corresponding to one of the operating voltages of the above semiconductor laser devices, wherein the laser drive circuit drives each semiconductor laser device by applying the power supply voltage corresponding to the operating voltage of the semiconductor laser device.

SUMMARY OF THE INVENTION

The above-described conventional technique of maintaining the drive voltage for the laser drive circuit at an appropriate level by use of a booster circuit is disadvantageous in that such a configuration may result in increased circuit space and increased device cost. Further, the technique disclosed in Japanese Patent Laid-Open No. 2003-168232 noted above requires a voltage variable power supply to control the power supply voltage of the drive means (or laser drive circuit), which may also result in an increase in the device cost. Further, the technique disclosed in Japanese Patent Laid-Open No. 2003-78202 noted above requires a power supply capable of generating different level power supply voltages, which may also result in increased circuit space and increased device cost. Furthermore, this technique cannot be used when the operating voltage of a semiconductor laser device (or laser diode) varies.

The present invention has been devised to solve the foregoing problems with the prior art techniques, and thereby to allow an optical disc apparatus to control the drive voltage for its laser drive circuit without using a booster circuit or a voltage variable power supply.

That is, an object of the present invention is to provide a low cost, high reliability optical disc apparatus capable of high speed write operation.

To achieve this object, the present invention provides the following techniques.

When an optical disc apparatus of the present invention writes to an optical disc, it detects the level of the drive voltage for its laser drive circuit (hereinafter referred to as the first voltage) and, based on the detected level, adjusts the drive voltage for its laser diode (hereinafter referred to as the second voltage) so as to adjust the first voltage to a level within an appropriate range and drive the laser drive circuit by the adjusted first voltage. According to another aspect of the present invention, the output of the laser drive circuit may be turned off depending on the detected level of the first voltage. According to still another aspect of the present invention, the data write speed is also adjusted in accordance with the above adjustment of the first and second voltages. For example, increasing the second voltage for the laser diode to accommodate an increase in the write speed may cause the first voltage to decrease to a reference value or lower. In such a case, both the second voltage and the write speed are reduced to appropriate levels such that the first voltage exceeds the reference value in order to maintain the write quality at an appropriate level.

DETAILED DESCRIPTION OF THE PREFERRED EMBODIMENTS

Preferred embodiments of the present invention will be described with reference to the accompanying drawings.

Figure 1:
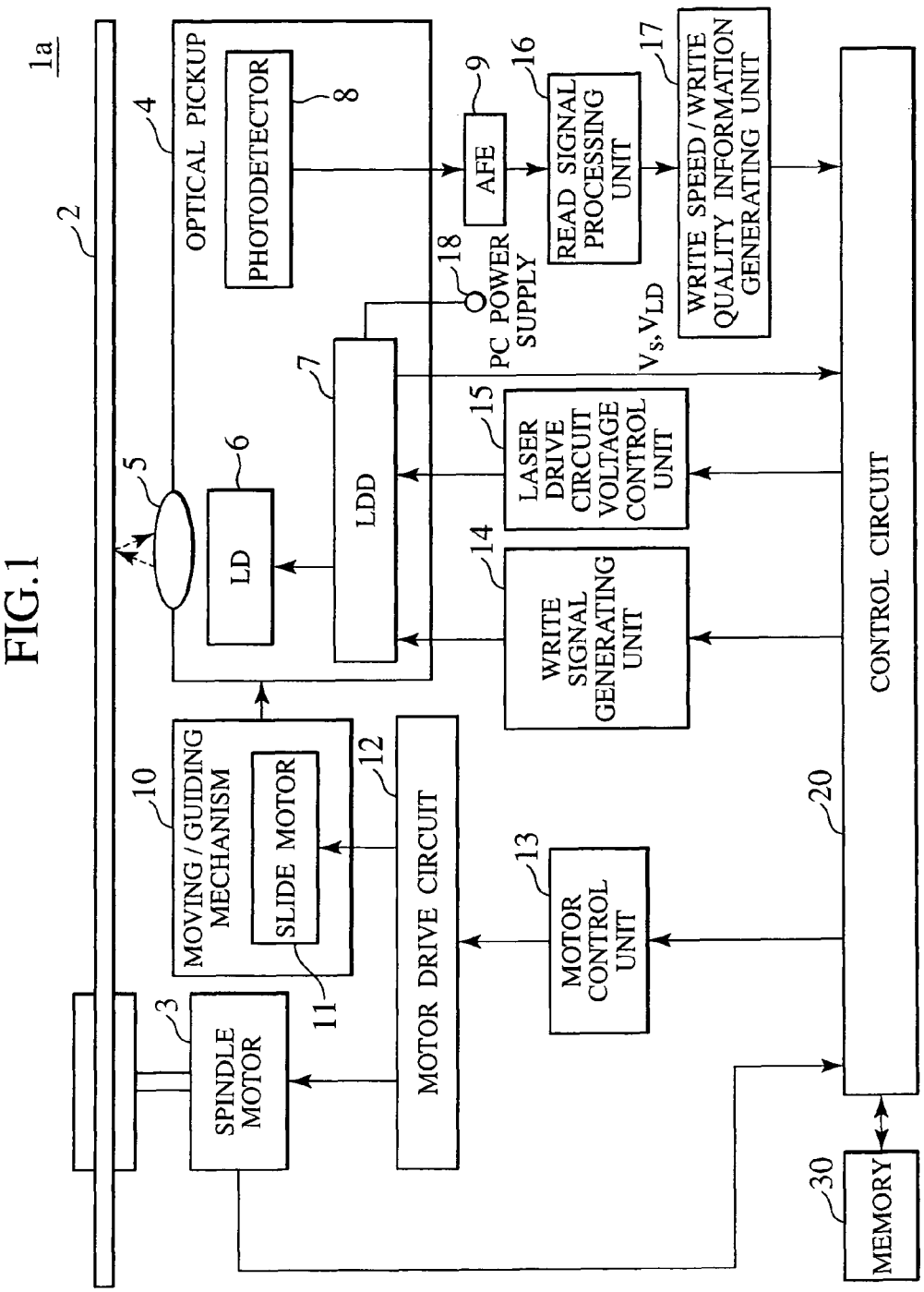
FIG. 1 is a diagram showing an exemplary configuration of an optical disc apparatus according to a first embodiment of the present invention.
Figure 2:
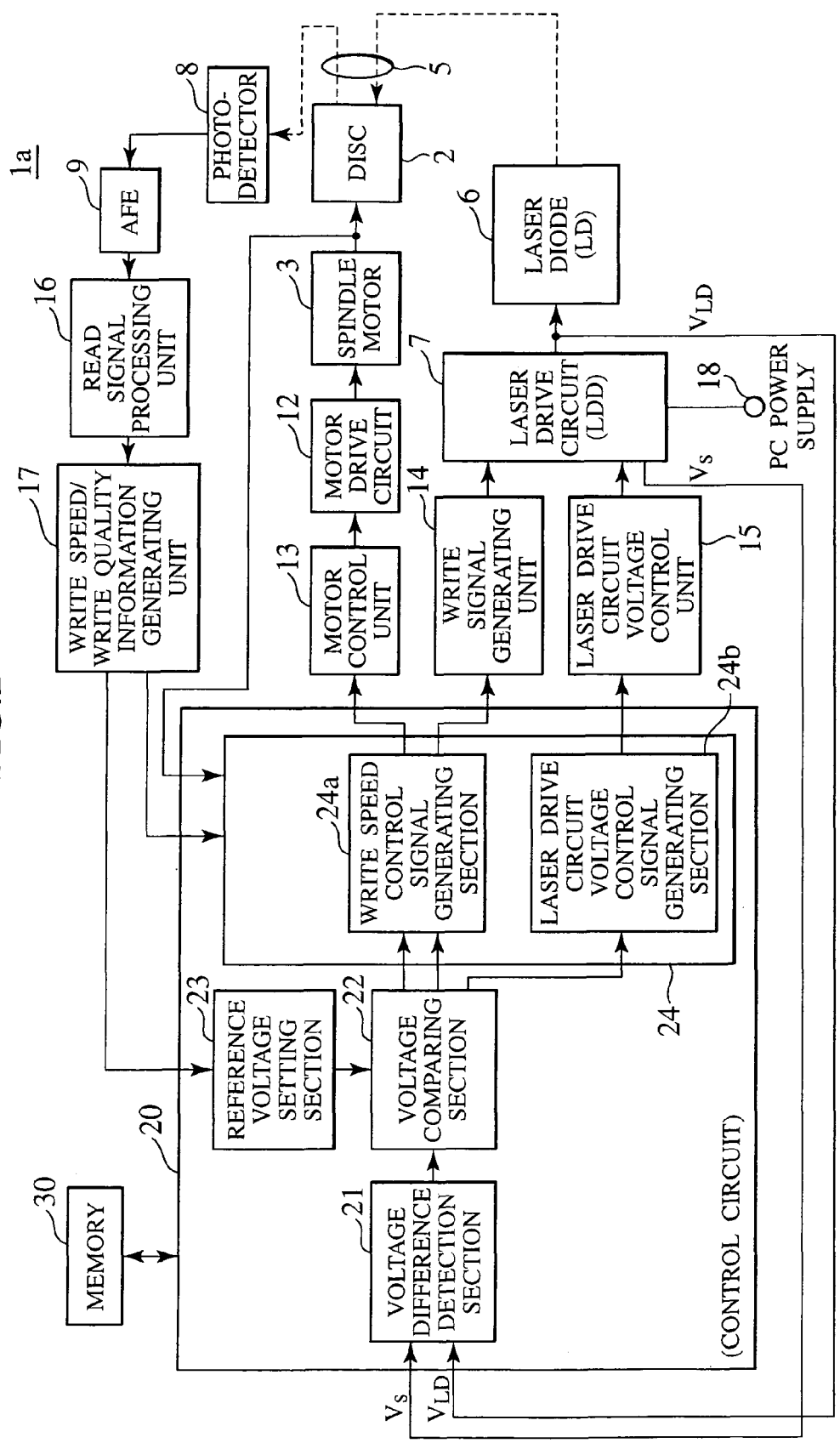
FIG. 2 is a diagram showing the configuration of the write control system of the optical disc apparatus shown in FIG. 1.
Figure 3:
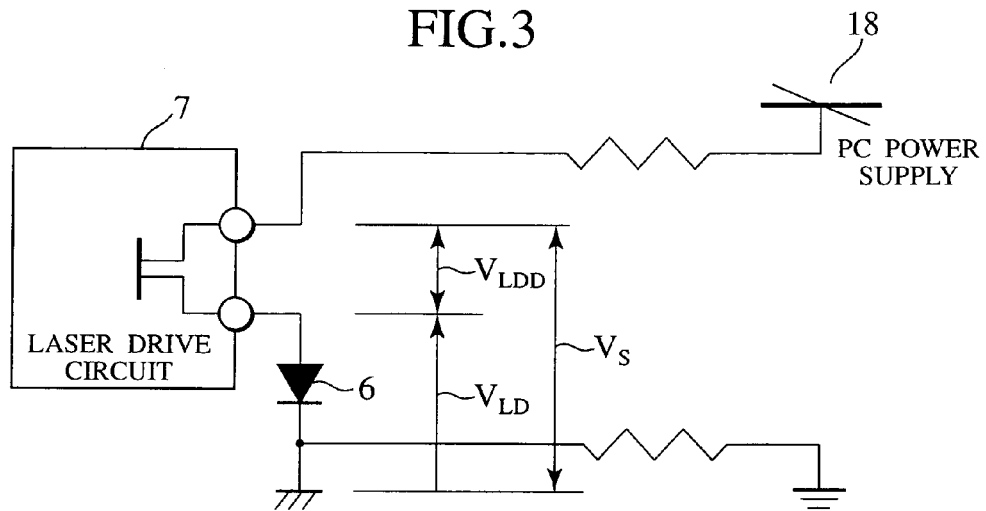
FIG. 3 is a diagram illustrating the drive voltages for the laser drive circuit and the laser diode in the optical disc apparatus shown in FIG. 1.
Figure 4:
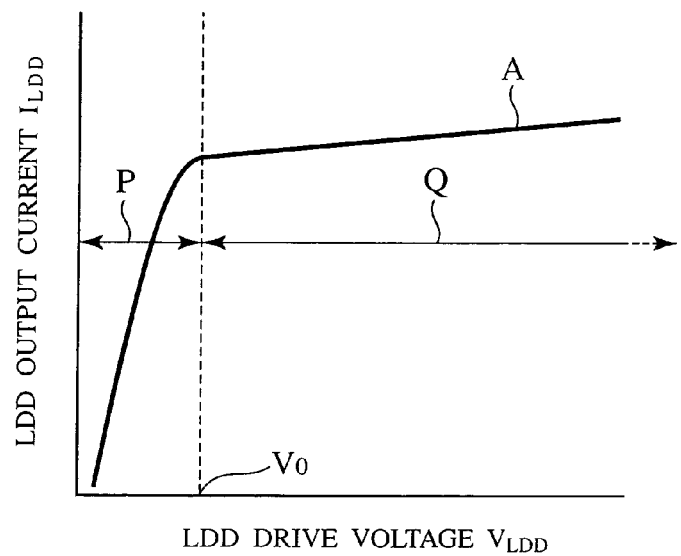
FIG. 4 is a diagram illustrating the operating characteristics of the laser drive circuit of the optical disc apparatus shown in FIG. 1.
Figure 5:
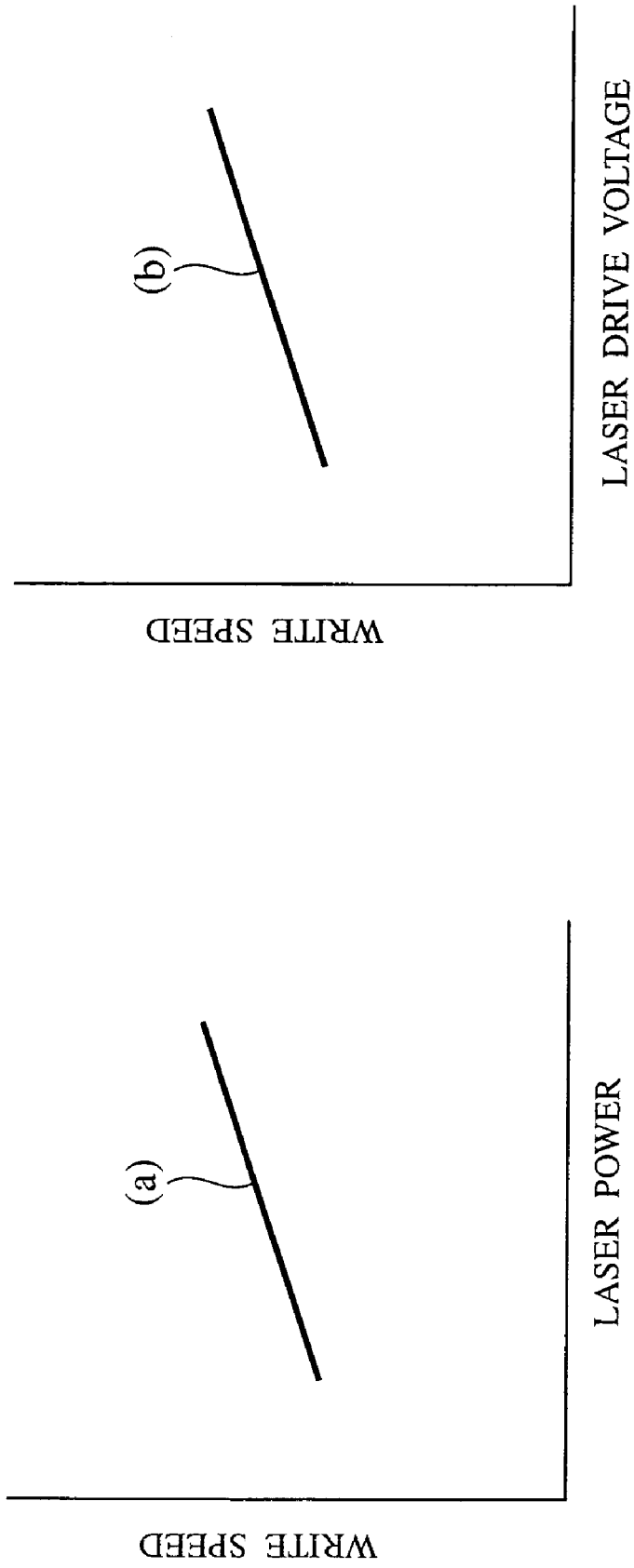
FIGS. 5A and 5B are diagrams illustrating the relationships between the write speed and operating parameters of the laser drive circuit and the laser diode in the optical disc apparatus shown in FIG. 1.
Figure 6:
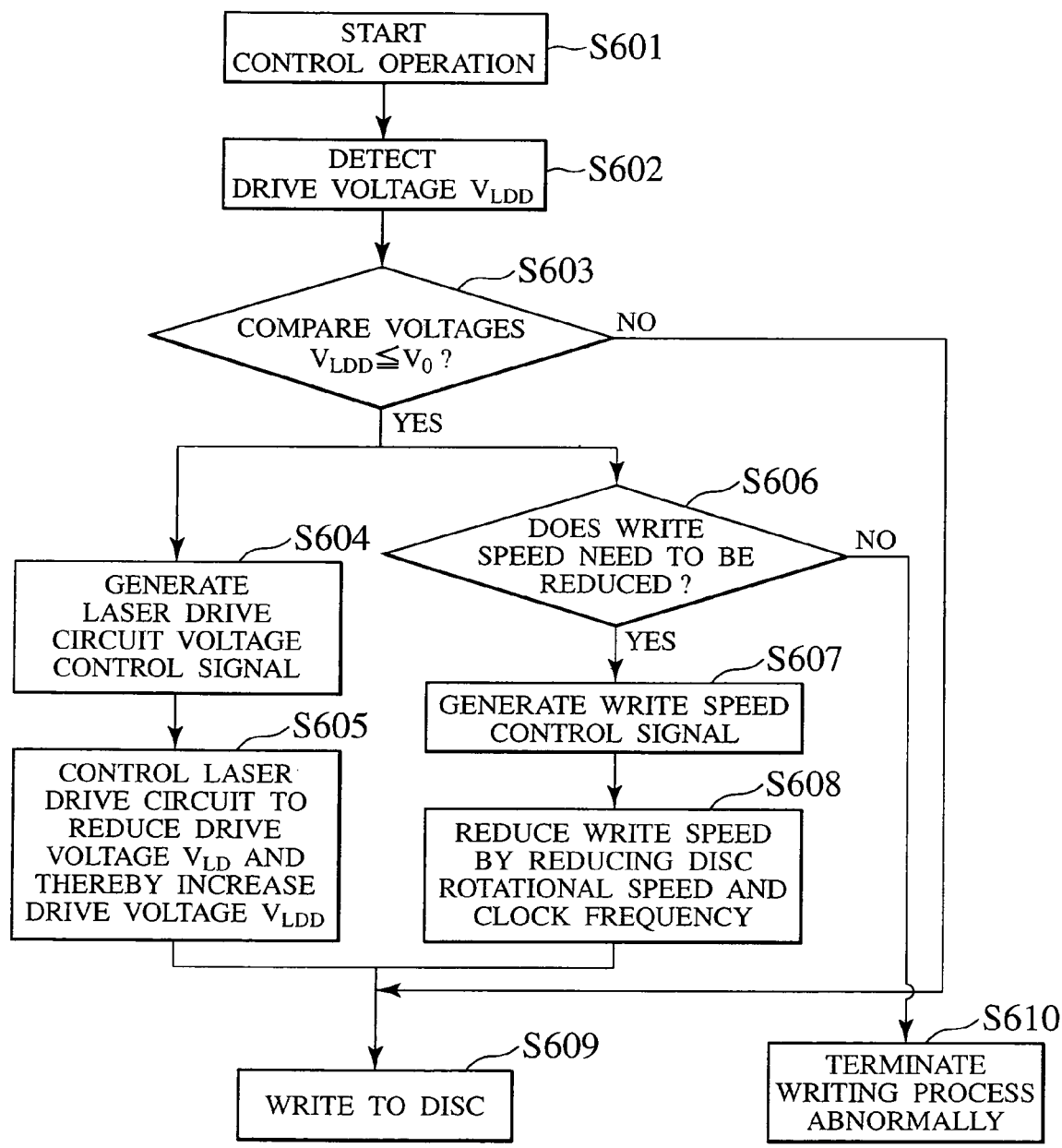
FIG. 6 is a flowchart illustrating the control operation performed within the optical disc apparatus shown in FIG. 1 when it writes to an optical disc.

FIGS. 1 to 6 are diagrams illustrating an optical disc apparatus according to a first embodiment of the present invention. Specifically, FIG. 1 is a diagram showing an exemplary configuration of the optical disc apparatus according to the first embodiment of the present invention; FIG. 2 is a diagram showing the configuration of the write control system of the optical disc apparatus shown in FIG. 1; FIG. 3 is a diagram illustrating the drive voltages for the laser drive circuit and the laser diode in the optical disc apparatus shown in FIG. 1; FIG. 4 is a diagram illustrating the operating characteristics of the laser drive circuit of the optical disc apparatus shown in FIG. 1; FIGS. 5A and 5B are diagrams illustrating the relationships between the write speed and operating parameters of the laser drive circuit and the laser diode in the optical disc apparatus shown in FIG. 1; and FIG. 6 is a diagram illustrating the control operation performed within the optical disc apparatus shown in FIG. 1 when it writes to an optical disc.

Referring to FIG. 1, reference numeral 1a denotes the optical disc apparatus of the first embodiment of the present invention; 2, an optical disc; 3, a spindle motor for rotating the optical disc 2; 4, an optical pickup; 5, an objective lens; 6, a laser diode for emitting a laser beam having a predetermined intensity for read and write operations; 7, a laser drive circuit for driving the laser diode 6; 8, a photodetector for receiving the laser beam reflected from the recording surface of the optical disc 2 through the objective lens 5 and converting it into an electrical signal; 9, an analog front end for performing analog signal processing such as amplification of the signal received from the photodetector 8; 10, a moving/guiding mechanism made up of a straight guide member (not shown), a lead screw member (not shown), etc. and used to move the optical pickup 4 approximately in a radial direction of the optical disc 2; 11, a slide motor within the moving/guiding mechanism 10 for rotating the lead screw member (not shown); 12, a motor drive circuit for driving the spindle motor 3 and the slide motor 11; 13, a motor control unit for controlling the motor drive circuit 12; 14, a write signal generating unit for generating a write signal to write to the recording surface of the optical disc 2; 15, a laser drive circuit voltage control unit for controlling the laser drive circuit driving voltage (hereinafter referred to as the first voltage) for driving the laser drive circuit 7; 16, a read signal processing unit for processing the read signal from the photodetector 8 to obtain an RF signal, a tracking error signal, and a focus error signal; 17, a write speed/write quality information generating unit for generating information on the write speed and write quality based on the processed read signal; 18, a PC power supply for supplying power to the laser drive circuit 7; 20, a control circuit for controlling the entire optical disc apparatus 1a; 30, memory (or memory means) for storing data processed by the control circuit 20; $V_S$, the power supply voltage supplied from the PC power supply 18 to the laser drive circuit 7; $V_{LDD}$, the first voltage for driving the laser drive circuit 7; and $V_{LD}$, the laser diode driving voltage (hereinafter referred to as the second voltage) applied to the laser diode 6 by the laser drive circuit 7.

The control circuit 20 is made up of, for example, a microprocessor or digital signal processor (DSP), etc. The first voltage $V_{LDD}$, which is generated from the power supply voltage $V_S$, drives the laser drive circuit 7 which in turn generates the second voltage $V_{LD}$ (for driving the laser diode 6) and applies it to the laser diode 6.

When the optical disc apparatus writes data to the optical disc 2, the control circuit 20 initially controls the motor control unit 13 to rotate the spindle motor 3 and hence the optical disc 2 at a speed corresponding to a predetermined write speed based on the write speed information supplied from the write speed/write quality information generating unit 17 and based on the rotational speed signal of the spindle motor 3 or the optical disc 2, and also controls the write signal generating unit 14 to generate a write signal having a clock frequency corresponding to the predetermined write speed. At that time, based on the write quality information supplied from the write speed/write quality information generating unit 17, the control circuit 20 also controls the laser drive circuit voltage control unit 15 to drive the laser drive circuit 7 by setting the first voltage $V_{LDD}$ (for the laser drive circuit) to a predetermined initial level and to cause the laser diode 6 to emit a laser beam having an optimal power or intensity by setting the second voltage $V_{LD}$ (for the laser diode) to a predetermined initial level.

Then, after the above initial setting (or initial control operations), the control circuit 20 detects the level of the first voltage $V_{LDD}$, generates a control signal based on the detection result, and thereby controls the laser drive circuit 7 through the laser drive circuit voltage control unit 15 to adjust the second voltage $V_{LD}$ or turn off the output of the laser drive circuit 7. The above adjustment of the second voltage $V_{LD}$ is made such that the first voltage $V_{LDD}$ is adjusted to a level within a predetermined range. Specifically, when the optical disc apparatus writes data to an optical disc 2, the control circuit 20 performs the following steps: determining the level of the first voltage $V_{LDD}$ by subtracting the second voltage $V_{LD}$ from the power supply voltage $V_S$; comparing the determined level of the first voltage $V_{LDD}$ with a reference level; and if it does not exceed the reference level, reducing the second voltage $V_{LD}$ so that the first voltage exceeds the reference level, or turning off the output of the laser drive circuit 7. Thus, the first voltage $V_{LDD}$, which drives the laser drive circuit 7, is increased, while the second voltage $V_{LD}$, which drives the laser diode 6, is reduced. That is, the first voltage $V_{LDD}$ is increased so that the laser drive circuit 7 operates properly. The reduction in the second voltage $V_{LD}$ for driving the laser diode 6 results in a reduction in the laser beam intensity.

When the laser diode 6 is driven by the reduced second voltage $V_{LD}$, the control circuit 20 performs control so as to reduce the data write speed to compensate for the reduction in the second voltage $V_{LD}$, that is, compensate for the reduction in the laser beam intensity, in order to properly write to the optical disc 2. This data write speed reduction control is achieved by reducing the rotational speed of the optical disc 2 and the clock frequency for the write signal. That is, the control circuit 20 generates a control signal based on the above detection result of the level of the first voltage $V_{LDD}$ and thereby controls the motor drive circuit 12 through the motor control unit 13 to reduce the rotational speed of the spindle motor 3 and hence the rotational speed of the optical disc 2. At that time, the control circuit 20 also controls the write signal generating unit 14 to reduce the clock frequency for the write signal. Furthermore, the control circuit 20 controls the motor drive circuit 12 to control the slide motor 11 and the moving/guiding mechanism 10 such that the traveling speed of the optical pickup 4 matches the above reduced write speed.

It should be noted that in the following description of the optical disc apparatus, components common to FIG. 1 are designated by the same reference numerals.

FIG. 2 is a diagram showing the configuration of the write control system of the optical disc apparatus 1a of the first embodiment shown in FIG. 1. It should be noted that components common to FIG. 1 are designated by the same reference numerals.

Referring to FIG. 2, reference numeral 21 denotes a voltage difference detection section within the control circuit 20 for receiving the power supply voltage $V_S$ and the second voltage $V_{LD}$ and determining the value of the first voltage $V_{LDD}$ by subtracting the second voltage $V_{LD}$ from the power supply voltage $V_S$; 22, a voltage comparing section within the control circuit 20 for comparing the value of the first voltage $V_{LDD}$ determined by the voltage difference detection unit 21 with a predetermined reference voltage value to determine whether or not it exceeds the reference voltage value; 23, a reference voltage setting section for setting the above reference voltage; 24, a control signal generating section for generating control signals to control the motor control unit 13, the write signal generating unit 14, and the laser drive circuit voltage control unit 15 based on the voltage level determination result output from the voltage comparing section 22; 24a, a write speed control signal generating section within the control signal generating section 24 for generating a write speed control signal to control the motor control unit 13 and the write signal generating unit 14; and 24b, a laser drive circuit voltage control signal generating section within the control signal generating section 24 for generating a laser drive circuit voltage control signal to control the laser drive circuit voltage control unit 15. All other reference numerals denote the same components shown in FIG. 1.

When the optical disc apparatus writes to the optical disc 2, the reference voltage setting section 23 initially sets a reference voltage based on the write quality information supplied from the write speed/write quality information generating unit 17. The value of the reference voltage is stored in the memory 30. Specifically, the reference voltage is set in such a way as to allow the laser drive circuit 7 to generate a stable output current. The write speed control signal generating section 24a generates a write speed control signal based on the voltage level determination result output from the voltage comparing section 22 and based on the write speed signal supplied from the write speed/write quality information generating unit 17 and a rotational speed signal of the spindle motor 3 or the optical disc 2. Specifically, when the optical disc apparatus writes to the optical disc 2, the write speed control signal generating section 24a initially controls the motor control unit 13 to rotate the spindle motor 3 and hence the optical disc 2 at a speed corresponding to a predetermined write speed based on the write speed information supplied from the write speed/write quality information generating unit 17 and based on a rotational speed signal of the spindle motor 3 or the optical disc 2, and also controls the write signal control unit 14 to generate a write speed control signal for generating a write signal having a clock frequency corresponding to the predetermined write speed. After this initial setting (or these initial control operations), the write speed control signal generating section 24a generates a write speed control signal based on the voltage level determination result output from the voltage comparing section 22. On the other hand, the laser drive circuit voltage control signal generating section 24b generates a laser drive circuit voltage control signal based on the voltage level determination result output from the voltage comparing section 22 and based on the write quality information supplied from the write speed/write quality information generating unit 17. More specifically, when the optical disc apparatus writes to the optical disc 2, the laser drive circuit voltage control signal generating section 24b initially controls the laser drive circuit voltage control unit 15 based on the write quality information supplied from the write speed/write quality information generating unit 17 to generate a laser drive circuit voltage control signal to cause the laser diode 6 to emit a laser beam having an optimal intensity. Then, after this initial setting (or initial control operation), the laser drive circuit voltage control signal generating section 24b generates a laser drive circuit voltage control signal based on the voltage level determination result output from the voltage comparing section 22.

If the voltage comparing section 22 determines that the value of the first voltage $V_{LDD}$ detected by the voltage difference detection unit 21 does not exceed the reference voltage value, the voltage comparing section 22 outputs a signal indicating the determination result to the control signal generating section 24. The write speed control signal generating section 24a and the laser drive circuit voltage control signal generating section 24b within the control signal generating section 24 generate and output a write speed control signal and a laser drive circuit voltage control signal, respectively, based on the above output from the voltage comparing section 22. The laser drive circuit voltage control signal is input to the laser drive circuit voltage control unit 15. Based on this laser drive circuit voltage control signal, the laser drive circuit voltage control unit 15 reduces the second voltage $V_{LD}$ such that the first voltage $V_{LDD}$ exceeds the above reference voltage value. On the other hand, the write speed control signal is input to the motor control unit 13 and the write signal generating unit 14. The motor control unit 13 controls the motor drive circuit 12 based on this write speed control signal to reduce the rotational speed of the spindle motor 3 and hence the rotational speed of the optical disc 2 to a predetermined value. The write signal control unit 14, on the other hand, reduces the clock frequency for the write signal to a predetermined value based on the write speed control signal. Thus reducing the rotational speed of the optical disc 2 and the clock frequency for the write signal to the predetermined appropriate values (and thereby reducing the write speed) allows data to be properly written to the optical disc 2 even when the intensity of the laser beam is reduced due to a reduction in the second voltage $V_{LD}$, which is applied by the laser drive circuit 7 and drives the laser diode 6.

It should be noted that in the following description of the optical disc apparatus, components common to FIG. 2 are designated by the same reference numerals.

FIG. 3 is a diagram illustrating the drive voltages for the laser drive circuit 7 and the laser diode 6 in the optical disc apparatus 1a shown in FIG. 1. It should be noted that components common to FIG. 1 are designated by the same reference numerals.

Referring to FIG. 3, the power supply voltage $V_S$ is supplied from the PC power supply 18 to the laser drive circuit 7. The first voltage $V_{LDD}$, which drives the laser drive circuit 7, and the second voltage $V_{LD}$, which drives the laser diode 6, are generated from the power supply voltage $V_S$. That is, the relationship between the power supply voltage $V_S$ and the first and second voltages $V_{LDD}$, $V_{LD}$ is represented by the equation: $V_S - V_{LD} = V_{LDD}$. The voltage difference detection section 21 (shown in FIG. 2) within the control circuit 20 receives the power supply voltage $V_S$ and the second voltage $V_{LD}$. The laser drive circuit voltage control signal generating section 24b (shown in FIG. 2) within the control circuit 20 controls the second voltage $V_{LD}$ through the laser drive circuit voltage control unit 15 such that the first voltage $V_{LDD}$ exceeds a reference voltage value.

FIG. 4 is a diagram illustrating the operating characteristics of the laser drive circuit 7 of the optical disc apparatus 1a shown in FIG. 1.

The laser drive circuit 7 usually exhibits an operating characteristic curve such as a characteristic curve A shown in FIG. 4. Specifically, referring to FIG. 4, when the $L_{DD}$ drive voltage (that is, the drive voltage, or first voltage, $V_{LDD}$ for the laser drive circuit) does not exceed a voltage value $V_0$ (that is, when it is within a range P in FIG. 4), the output current $I_{LDD}$ of the laser drive circuit 7 varies largely with variations in the drive voltage $V_{LDD}$, resulting in an unstable operation. On the other hand, when the drive voltage $V_{LDD}$ exceeds the voltage value $V_0$ (that is, when it is within a range Q in FIG. 4), the output current $I_{LDD}$ of the laser drive circuit 7 varies only slightly with variations in the drive voltage, or first voltage, $V_{LDD}$, resulting in a stable operation. In the optical disc apparatus 1a of the first embodiment, the reference voltage setting section 23 sets the voltage value $V_0$, which is used as a reference voltage value, and the control system shown in FIG. 2 adjusts the first voltage $V_{LDD}$ (for driving the laser drive circuit 7) to a value higher than the voltage value $V_0$ and thereby allows for a proper write operation.

FIGS. 5A and 5B are diagrams illustrating the relationships between the write speed and operating parameters of the laser drive circuit 7 and the laser diode 6 in the optical disc apparatus 1a shown in FIG. 1. Specifically, FIG. 5A shows the write speed vs. required laser power characteristic (denoted by symbol a), while FIG. 5B shows the write speed vs. required laser drive voltage $V_{LD}$ characteristic (denoted by symbol b).

As can be seen from FIG. 5, the laser power (or laser beam intensity) required for proper write operation increases with increasing write speed, and the second voltage (or laser drive voltage) $V_{LD}$ must be increased to increase the laser power (or laser beam intensity). However, an increase in the second voltage $V_{LD}$ results in a reduction in the first voltage $V_{LDD}$. This means that when the second voltage $V_{LD}$ is increased, the first voltage $V_{LDD}$ may decrease to the voltage value $V_0$ or lower (that is, to a value within the range P in FIG. 4) and thereby the output current of the laser drive circuit 7 may drastically decrease, resulting in degraded write quality. To address this problem, the optical disc apparatus 1a of the first embodiment is configured such that a large reduction in the first voltage $V_{LDD}$ and hence a degradation in the write quality are prevented by reducing both the second voltage $V_{LD}$ and the write speed, as described with reference to FIGS. 1 to 4. This allows proper write operation by the laser power with the reduced second voltage $V_{LD}$.

FIG. 6 is a flowchart illustrating the control operation performed within the optical disc apparatus 1a shown in FIG. 1 when it writes to the optical disc 2.

(1) First, the control circuit 20 starts its data write control operation at step S601.

(2) At step S602, the voltage difference detection section 21 of the control circuit 20 determines the value of the first voltage $V_{LDD}$ by subtracting the second voltage $V_{LD}$ from the power supply voltage $V_S$.

(3) At step S603, the voltage comparing section 22 of the control circuit 20 compares the first voltage $V_{LDD}$ with a reference voltage $V_0$ to determine whether or not the first voltage $V_{LDD}$ exceeds the reference voltage $V_0$.

(4) If it is determined at step S603 that the first voltage $V_{LDD}$ does not exceed the reference voltage $V_0$, the laser drive circuit voltage control signal generating section 24b in the control signal generating section 24 of the control circuit 20 generates a laser drive circuit voltage control signal for controlling the second voltage $V_{LD}$ and the first voltage $V_{LDD}$ of the laser drive circuit 7 and inputs it to the laser drive circuit voltage control unit 15 at step S604.

(5) At step S605, the laser drive circuit voltage control unit 15 controls the laser drive circuit 7 based on the laser drive circuit control signal to reduce the second voltage $V_{LD}$ such that the first voltage $V_{LDD}$ exceeds the reference voltage $V_0$.

(6) Further, if it is determined at step S603 that the first voltage $V_{LDD}$ does not exceed the reference voltage $V_0$ (as in (4) above), at step S606, the control signal generating section 24 of the control circuit 20 determines whether the write speed can and should be reduced.

(7) If it is determined at step S606 that the write speed can and should be reduced, the write speed control signal generating section 24a in the control signal generating section 24 of the control circuit 20 generates a write speed control signal for reducing the write speed and inputs it to the motor control unit 13 and the write signal generating unit 14 at step S607.

(8) At step S608, the motor control unit 13 controls the motor drive circuit 12 based on the write speed control signal to reduce the rotational speed of the spindle motor 3 and hence the rotational speed of the optical disc 2. Further, the write signal generating unit 14 reduces the clock frequency for the write signal and inputs the resultant write signal to the laser drive circuit 7.

(9) At step S609, the laser drive circuit 7 is driven by the first voltage $V_{LDD}$, which has been reduced at step S605, and the laser diode 6 is driven by the second voltage $V_{LD}$. Further, the write signal, whose clock frequency has been reduced at step S608, is applied to the laser diode 6 (through the laser drive circuit 7), so that the laser diode 6 emits a laser beam. The emitted laser beam is delivered to the recording surface of the optical disc 2, whose rotational speed has been reduced at step S608, thus writing data to the optical disc 2.

(10) On the other hand, if it is determined at step 603 that the first voltage $V_{LDD}$ exceeds the reference voltage $V_0$, the laser drive circuit voltage control signal generating section 24b in the control signal generating section 24 does not generate a laser drive circuit voltage control signal for controlling the second voltage $V_{LD}$ and the first voltage $V_{LDD}$ of the laser drive circuit 7, and the write speed signal generating section 24a also does not generate a write speed control signal. Then, the optical disc apparatus writes data to the optical disc 2.

(11) Further, if it is determined at step S606 that the write speed cannot or need not be reduced, the write speed control signal generating section 24a does not generate a write speed control signal for reducing the write speed, and the control circuit 20 stops the write operation at step S610, thus terminating the writing process abnormally. It should be noted that the write speed cannot or need not be reduced when it is currently set to its minimum value or default value.

It should be further noted that the control circuit 20 automatically performs the above series of steps (S601 to S611) according to a program stored in memory means within the optical disc apparatus 1a, such as the memory 30.

Thus, the optical disc apparatus 1a of the first embodiment can maintain the drive voltage (or first voltage) for its laser drive circuit at an appropriate level without using a booster circuit, etc. Therefore, this optical disc apparatus has a low cost configuration and can reliably perform a write operation at high speed.

Figure 7:
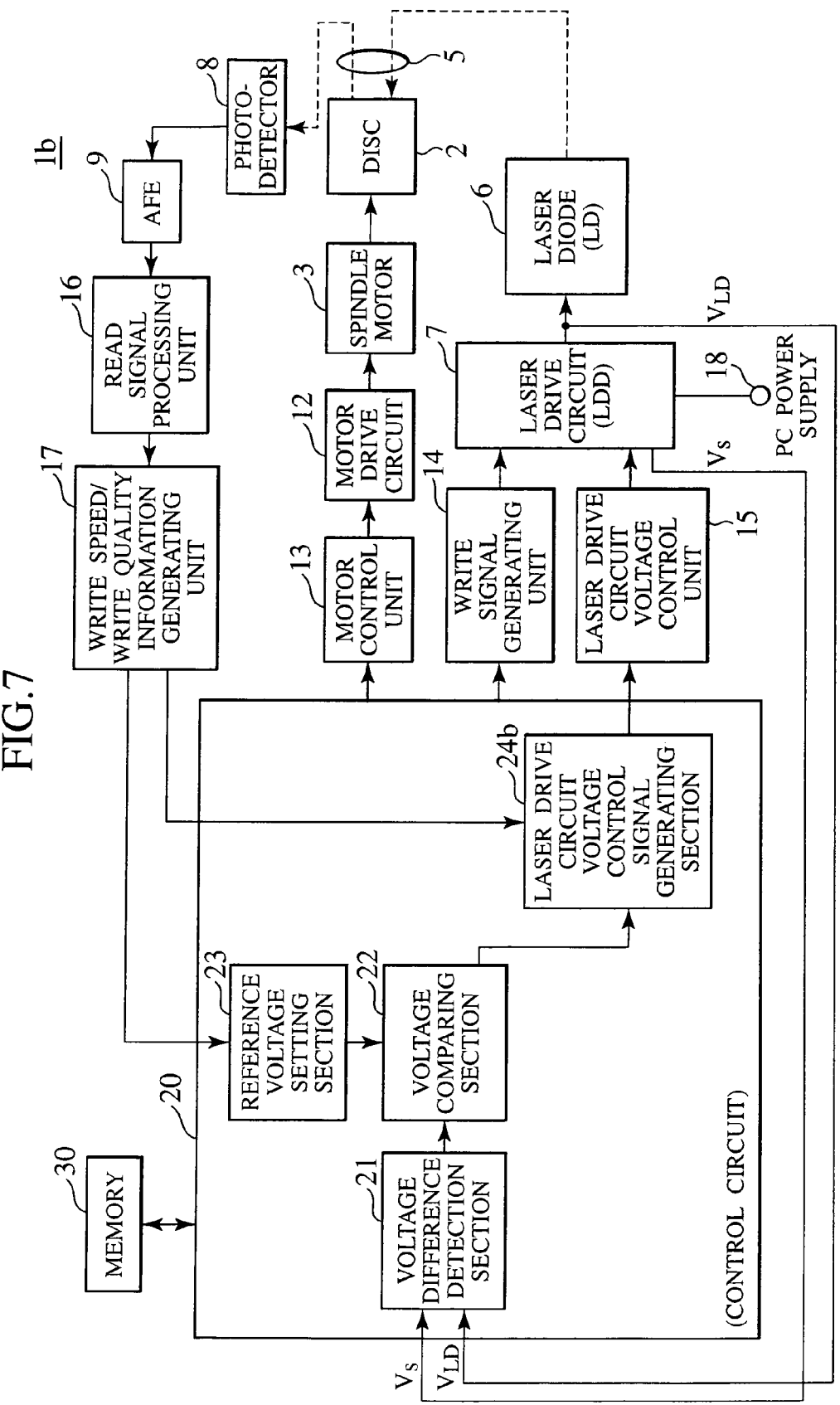
FIG. 7 is a diagram showing an exemplary configuration of an optical disc apparatus according to a second embodiment of the present invention.
Figure 8:
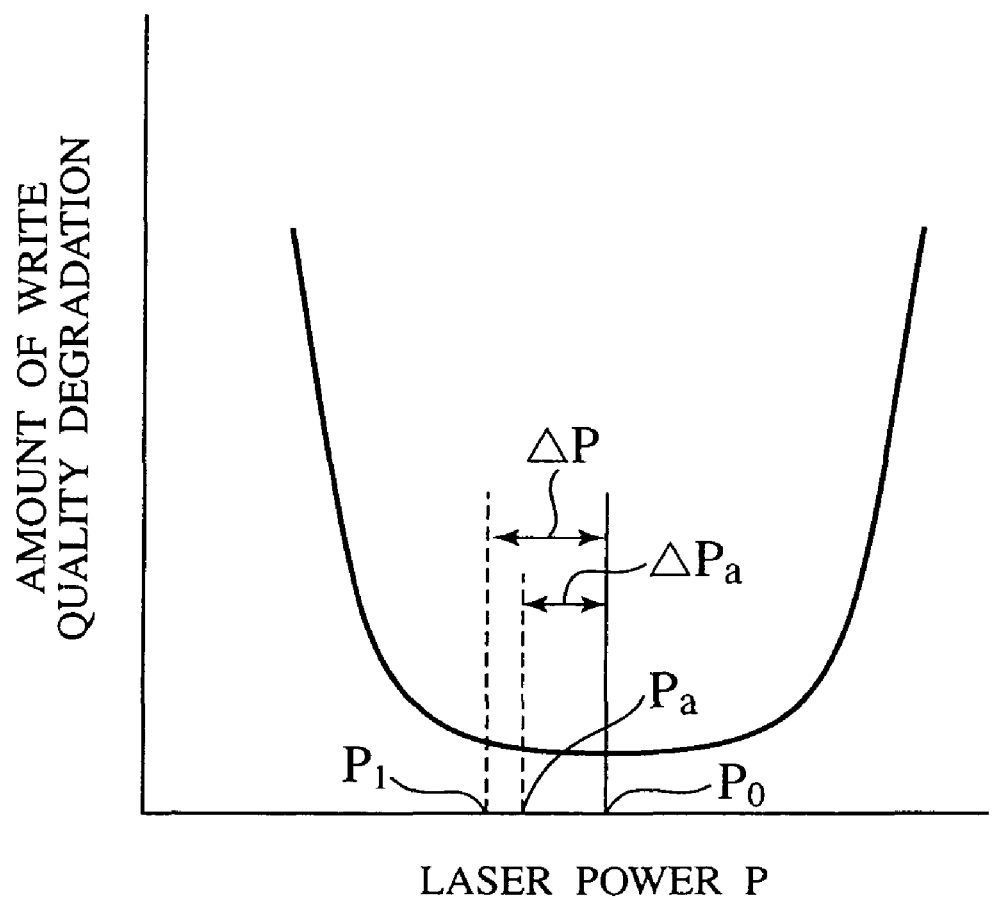
FIG. 8 is a diagram illustrating a writing power range (or laser beam intensity range) in which the optical disc apparatus shown in FIG. 7 can achieve an appropriate level of write quality.
Figure 9:
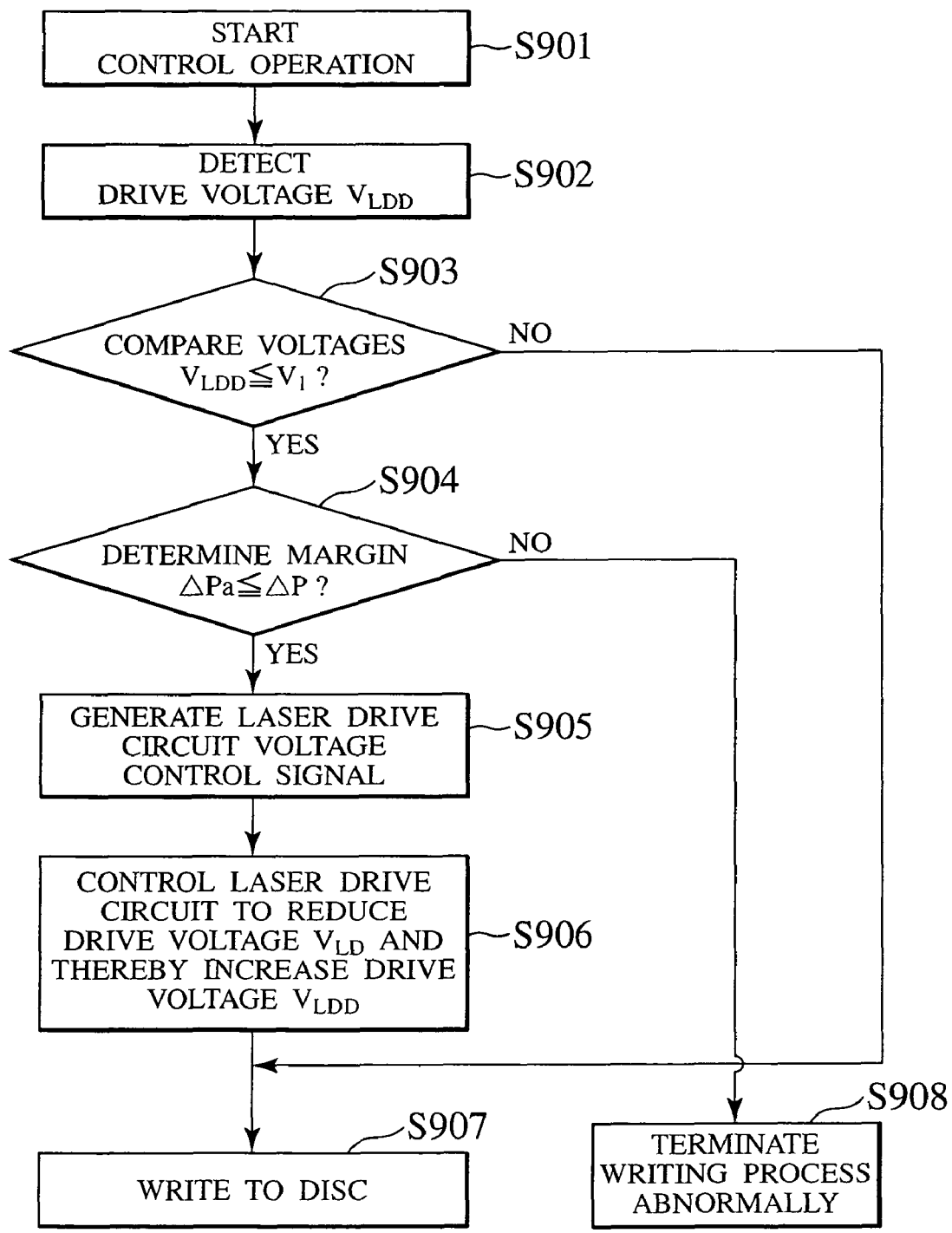
FIG. 9 is a flowchart illustrating the control operation performed within the optical disc apparatus shown in FIG. 7 when it writes to an optical disc.

FIGS. 7 to 9 are diagrams illustrating an optical disc apparatus according to a second embodiment of the present invention. Specifically, FIG. 7 is a diagram showing the configuration of the optical disc apparatus of the second embodiment; FIG. 8 is a diagram illustrating a writing power range (or laser beam intensity range) in which the optical disc apparatus shown in FIG. 7 can achieve an appropriate level of write quality; and FIG. 9 is a diagram illustrating the control operation performed within the optical disc apparatus shown in FIG. 7 when it writes to the optical disc 2. The optical disc apparatus of the second embodiment differs from that of the first embodiment in that it does not control the write speed during data write operation although it adjusts the drive voltage (or first voltage) for the laser drive circuit and the drive voltage (or second voltage) for the laser diode depending on the value of the drive voltage (or first voltage) for the laser drive circuit.

It should be noted that in FIGS. 7 to 9 and the following description, components and voltages common to the optical disc apparatus 1a of the first embodiment (shown in FIGS. 1 and 2) retain the same reference numerals.

In FIG. 7, reference numeral 1b denotes the optical disc apparatus according to the second embodiment of the present invention. Referring to FIG. 7, the voltage comparing section 22 receives the value of the first voltage $V_{LDD}$ detected by the voltage difference detection section 21 and compares it with a reference voltage value to determine whether or not the first voltage $V_{LDD}$ exceeds the reference voltage value. If the voltage comparing section 22 determines that the first voltage $V_{LLD}$ does not exceed the reference voltage value, it outputs a signal indicating the determination result to the laser drive circuit voltage control signal generating section 24b. The laser drive circuit voltage control signal generating section 24b generates and outputs a laser drive circuit voltage control signal based on the output from the voltage comparing section 22. The laser drive circuit voltage control signal is input to the laser drive circuit voltage control unit 15. The laser drive circuit voltage control unit 15 reduces the second voltage $V_{LD}$ based on this signal such that the first voltage $V_{LDD}$ exceeds the above reference voltage value. More specifically, the second voltage $V_{LD}$ is reduced so as to provide writing power (or laser beam intensity) within a range that allows for a certain level of write quality. This writing power range (or laser beam intensity range) is determined based on the optimum writing power level determined by OPC (Optimum Power Control) processing.

FIG. 8 is a diagram illustrating a writing power range (or laser beam intensity range) in which the laser diode 6 of the optical disc apparatus 1b shown in FIG. 7 can provide an appropriate level of write quality.

In FIG. 8, the horizontal axis represents the laser power (or writing power or laser beam intensity), denoted by P, in write operation, and the vertical axis represents the amount of write quality degradation. Further, symbol $P_0$ denotes the optimum writing power determined by OPC processing; $P_1$, the minimum writing power required to maintain the write quality at an appropriate level; $P_a$, the current wiring power in write operation; $\Delta P$, the difference between the optimum writing power $P_0$ and the minimum writing power $P_1$, that is, the maximum wiring power margin; and $\Delta P_a$, the difference between the optimum writing power $P_0$ and the current writing power $P_a$. If the voltage comparing section 22 determines that the value of the first voltage $V_{LDD}$ detected by the voltage difference detection section 21 does not exceed a reference voltage value $V_1$, the control circuit 20 calculates the difference $\Delta P_a$ between the current writing power $P_a$ and the optimum wiring power $P_0$, which is obtained by OPC processing, and compares it with the maximum writing power margin $\Delta P$ to determine whether or not the difference $\Delta P_a$ exceeds the maximum writing power margin $\Delta P$. It should be noted that $\Delta P - \Delta P_a$ represents the current writing power margin (that is, the maximum allowable writing power variation from the current writing power value $P_a$). Only if this margin is equal to or larger than zero (that is, $\Delta P_a = \Delta P$), does the laser drive circuit voltage control unit 15 control the laser drive circuit 7 based on the laser drive circuit voltage control signal to reduce the second voltage $V_{LD}$ such that the first voltage $V_{LDD}$ exceeds the above reference voltage value $V_1$ as long as the writing power difference $\Delta P_a$ does not exceed the maximum writing power margin $\Delta P$, that is, as long as the current writing power margin $\Delta P - \Delta P_a$ remains not negative.

FIG. 9 is a flowchart illustrating the control operation performed within the optical disc apparatus shown in FIG. 7 when it writes to the optical disc 2.

(1) First, the control circuit 20 starts its data write control operation at step S901.

(2) At step S902, the voltage difference detection section 21 of the control circuit 20 determines the value of the first voltage $V_{LDD}$ by subtracting the second voltage $V_{LD}$ from the power supply voltage $V_S$.

(3) At step S903, the voltage comparing section 22 of the control circuit 20 compares the first voltage $V_{LDD}$ with the reference voltage $V_1$ to determine whether or not the first voltage $V_{LDD}$ exceeds the reference voltage $V_1$.

(4) If it is determined at step S903 that the first voltage $V_{LDD}$ does not exceed the reference voltage $V_1$, the control circuit 20 determines the current writing power margin (that is, the maximum allowable writing power variation from the current writing power value $P_a$). That is, at step S904 the control circuit 20 compares the difference $\Delta P_a$ between the optimum writing power $P_0$ obtained by OPC processing and the current writing power $P_a$ with the difference $\Delta P$ between the optimum writing power $P_0$ and the minimum writing power $P_1$ (required to maintain the write quality at an appropriate level) to determine whether the difference between these differences, specifically $\Delta P - \Delta P_a$, is not smaller than zero.

(5) If it is determined at step S904 that the current writing power margin, $\Delta P - \Delta P_a$, is not smaller than zero (that is, $\Delta P_a = \Delta P$), the laser drive circuit voltage control signal generating section 24b of the control circuit 20 generates a laser drive circuit voltage control signal for controlling the second voltage $V_{LD}$ and the first voltage $V_{LDD}$ of the laser drive circuit 7 and inputs it to the laser drive circuit voltage control unit 15 at step S905.

(6) At step S906, the laser drive circuit voltage control unit 15 controls the laser drive circuit 7 based on the laser drive circuit control signal to reduce the second voltage $V_{LD}$ such that the first voltage $V_{LDD}$ exceeds the reference voltage $V_1$.

(7) At step S907, the laser drive circuit 7 is driven by the first voltage $V_{LDD}$, which has been reduced at step S906, and the laser diode 6 is driven by the second voltage $V_{LD}$. It should be noted that at that time the write speed is not changed.

(8) On the other hand, if it is determined at step S903 that the first voltage $V_{LDD}$ exceeds the reference voltage $V_1$, the laser drive circuit voltage control signal generating section 24b does not generate the laser drive circuit voltage control signal for controlling the second voltage $V_{LD}$ and the first voltage $V_{LDD}$, and the optical disc apparatus performs a write operation on the optical disc 2 immediately.

(9) Further, if it is determined at step S904 that the current writing power margin is negative, the control circuit 20 causes the laser drive circuit voltage control signal generating section 24b not to generate the laser drive circuit voltage control signal and stops the write operation at step S908, thus terminating the writing process abnormally.

It should be noted that the control circuit 20 automatically performs the above series of steps (S901 to S908) according to a program stored in memory means within the optical disc apparatus 1b, such as the memory 30.

Thus, the optical disc apparatus 1b of the second embodiment also has a low cost configuration and can reliably perform a write operation at high speed.

Figure 10:
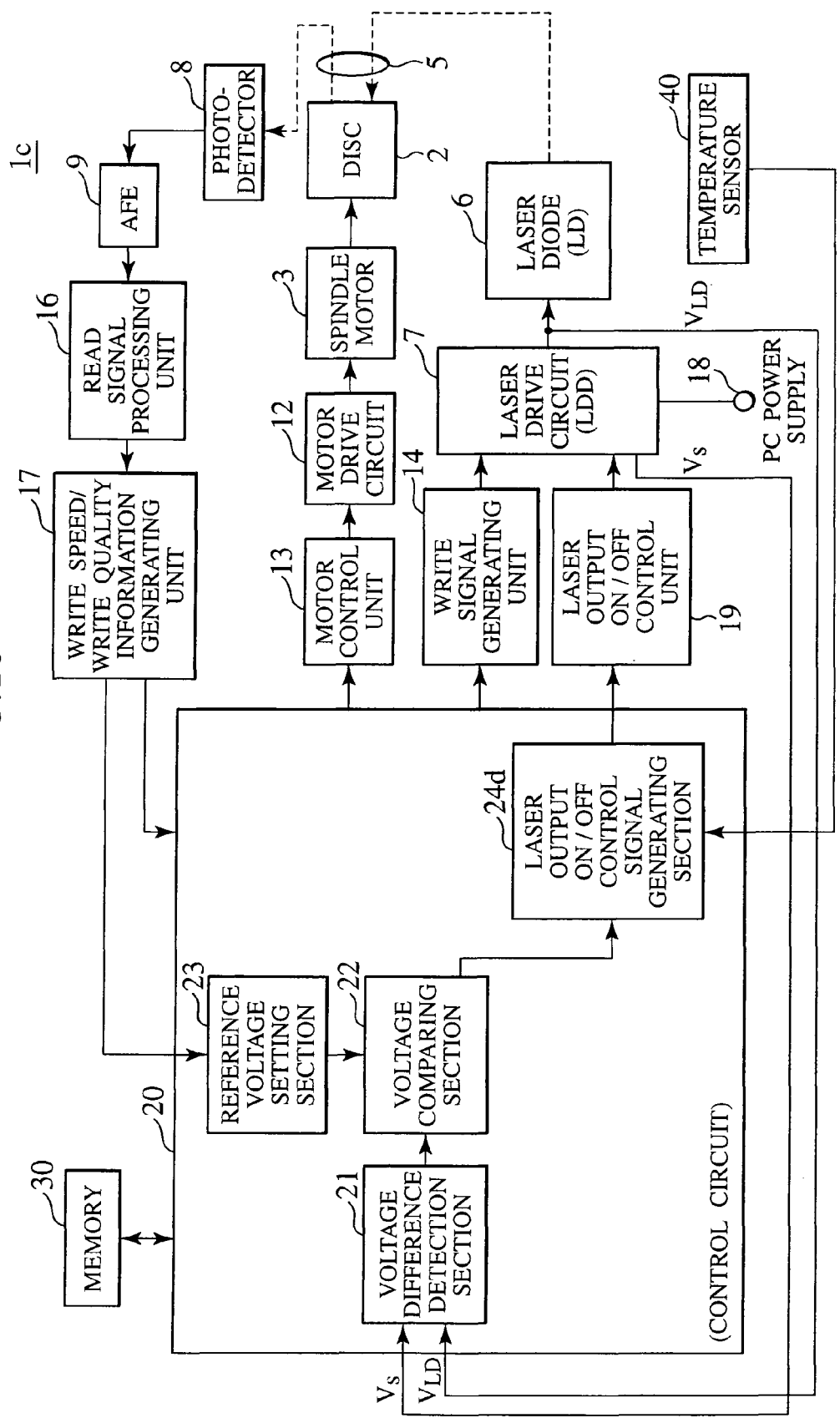
FIG. 10 is a diagram showing an exemplary configuration of an optical disc apparatus according to a third embodiment of the present invention.
Figure 11:
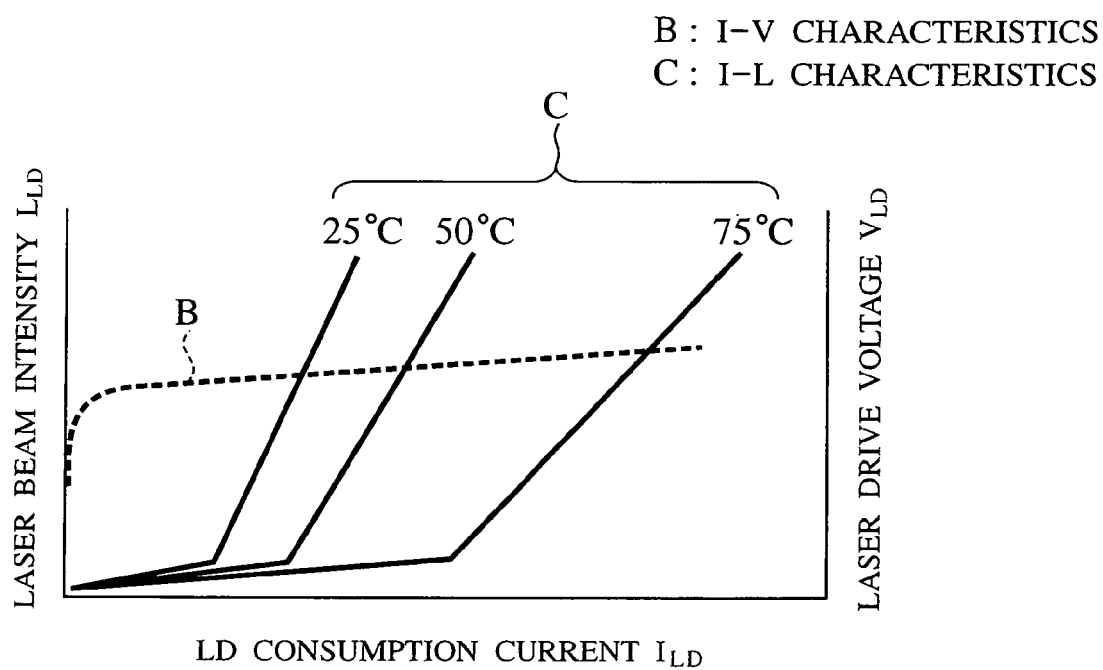
FIG. 11 is a diagram illustrating the laser beam intensity and laser drive voltage characteristics of the optical disc apparatus shown in FIG. 10.
Figure 12:
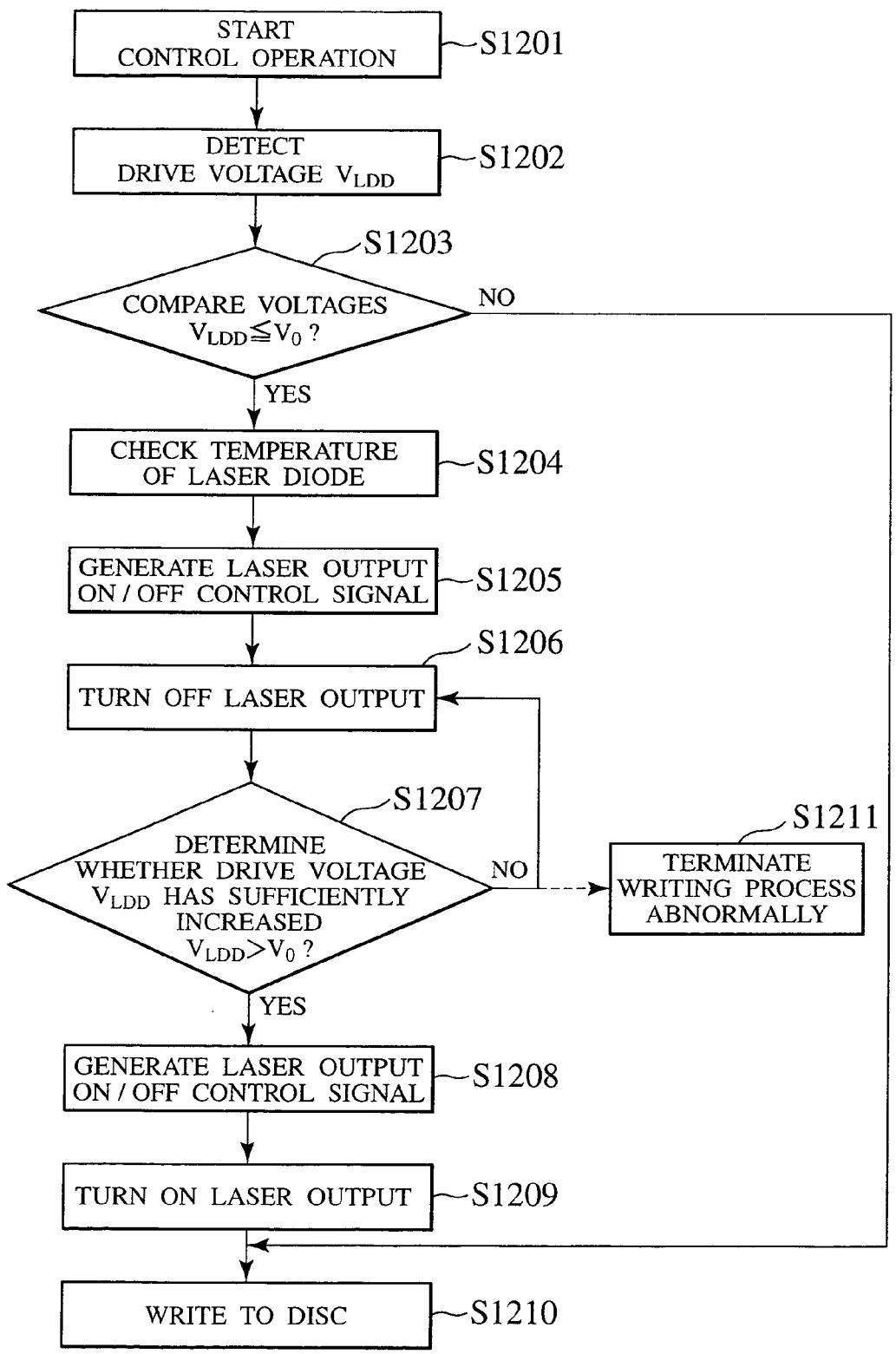
FIG. 12 is a flowchart illustrating the control operation performed within the optical disc apparatus shown in FIG. 10 when it writes to an optical disc.

FIGS. 10 to 12 are diagrams illustrating an optical disc apparatus according to a third embodiment of the present invention. Specifically, FIG. 10 is a diagram showing the configuration of the optical disc apparatus of the third embodiment; FIG. 11 is a diagram illustrating the laser beam intensity and laser drive voltage characteristics of the laser diode of the optical disc apparatus shown in FIG. 10; and FIG. 12 is a diagram illustrating the control operation performed within the optical disc apparatus shown in FIG. 10 when it writes to an optical disc. The optical disc apparatus of the third embodiment differs from that of the first embodiment in that during data write operation, the output of the laser drive circuit is turned on or off depending on the drive voltage (or first voltage) for the laser drive circuit. The third embodiment does not adjust the drive voltage (or second voltage) for the laser diode and the drive voltage (or first voltage) for the laser drive circuit, nor does it control the write speed.

It should be noted that in FIGS. 10 to 12 and the following description, components and voltages common to the optical disc apparatus 1a of the first embodiment (shown in FIGS. 1 and 2) retain the same reference numerals.

In FIG. 10, reference numeral 1c denotes the optical disc apparatus according the third embodiment of the present invention; 24d, a laser output on/off control signal generating section in the control circuit 20 for generating a laser output on/off control signal to turn on or off the output of the laser drive circuit 7; 19, a laser output on/off control unit for controlling the laser drive circuit 7 based on the laser output on/off control signal to turn on or off the output of the laser drive circuit 7; and 40, a temperature sensor for detecting the temperature of the laser diode 6. The temperature sensor 40 is made up of, for example, a thermistor, and its output signal is input to the laser output on/off control signal generating section 24d.

Referring to FIG. 10, the voltage comparing section 22 receives the value of the first voltage $V_{LDD}$ detected by the voltage difference detection section 21 and compares it with a reference voltage value to determine whether or not it exceeds the reference voltage value. If the voltage comparing section 22 determines that the first voltage $V_{LLD}$ does not exceed the reference voltage value, it outputs a signal indicating the determination result to the laser output on/off control signal generating section 24d. The laser output on/off control signal generating section 24d also receives the output signal of the temperature sensor 40. If the output signal from the temperature sensor 40 indicates that the temperature of the laser diode 6 is equal to or higher than a reference value, the laser output on/off control signal generating section 24d generates and outputs a laser output on/off control signal (namely, a laser output turn-off signal) based on the output from the voltage comparing section 22. This laser output on/off control signal is input to the laser output on/off control unit 19. The laser output on/off control unit 19 controls the laser drive circuit 7 based on the received laser output on/off control signal to turn off the output of the laser drive circuit 7. As a result, no drive voltage is applied to the laser diode 6, causing the laser diode 6 to stop emitting a laser beam and thus stopping the data write operation to the optical disc 2.

Since the laser diode 6 has stopped emitting a laser beam, the temperature of the laser diode 6 falls, resulting in a reduction in the second voltage $V_{LD}$ for driving the laser diode 6 and hence an increase in the first voltage $V_{LDD}$ for driving the laser drive circuit 7. If the voltage comparing section 22 determines that the first voltage $V_{LLD}$ has become higher than the reference voltage value, it outputs a signal indicating the determination result to the laser output on/off control signal generating section 24d. The output on/off control signal generating section 24d generates and outputs a laser output on/off control signal (namely, a laser output turn-on signal) based on the output from the voltage comparing section 22. This laser output on/off control signal is input to the laser output on/off control unit 19. Based on the received laser output on/off control signal, the laser output on/off control unit 19 turns on the output of the laser drive circuit 7 (causing the laser drive circuit 7 to output the drive voltage, or the second voltage, to the laser diode 6). As a result, the laser diode 6 resumes its laser beam emission to write to the optical disc 2.

FIG. 11 is a diagram illustrating the laser beam intensity and laser drive voltage characteristics of the laser diode 6 of the optical disc apparatus 1c shown in FIG. 10 when the optical disc apparatus 1c writes to the optical disc 2.

Specifically, FIG. 11 shows an I-V (laser diode consumption current vs. laser drive voltage) characteristic, denoted by B, and I-L (laser diode consumption current vs. laser beam intensity) characteristics, denoted by C. The horizontal axis for these characteristics represents the current (or consumption current) $I_{LD}$ of the laser diode 6. On the other hand, the vertical axis for the I-V characteristic B represents the drive voltage (or second voltage) $V_{LD}$ for the laser diode 6, and the vertical axis for the I-L characteristics C represents the laser beam intensity $L_{LD}$. These I-L characteristics C are delivered by the laser diode 6 at 25° C., 50° C., and 75° C., respectively. As indicated by the I-L characteristics C, as the temperature of the laser diode 6 increases, so does the LD (laser diode) consumption current $I_{LD}$, resulting in an increase in the drive voltage (or second voltage) $V_{LD}$. Increasing the write speed results in a further increase in the LD consumption current $I_{LD}$ and hence a further increase in the drive voltage (or second voltage) $V_{LD}$, since the laser beam intensity $L_{LD}$ must be increased to accommodate the increase in the write speed. The increase in the LD consumption current $I_{LD}$ leads to a further increase in the temperature of the laser diode 6, while the increase in the drive voltage (or second voltage) $V_{LD}$ results in a reduction in the drive voltage (or first voltage) $V_{LDD}$ for the laser drive circuit 7 and hence degradation in the write quality. Further, the increase in the LD consumption current $I_{LD}$ and in the drive voltage (or second voltage) $V_{LD}$ results in an increase in the power consumption of the laser diode 6. To address this problem, the optical disc apparatus 1c of the third embodiment is configured such that: the control circuit 20 monitors the reduction in the drive voltage (or first voltage) $V_{LDD}$ for the laser drive circuit 7 due to an increase in the drive voltage (or second voltage) $V_{LD}$ caused by increased temperature of the laser diode 6; and if the drive voltage (or first voltage) $V_{LDD}$ does not exceed the reference voltage value, the control circuit 20 causes the laser drive circuit 7 to turn off its output and thereby not to drive the laser diode 6, so that the laser diode 6 stops emitting a laser beam, thus halting the write operation. Then, if the temperature of the laser diode 6 has fallen and thereby the drive voltage (or first voltage) $V_{LDD}$ for the laser drive circuit 7 has exceeded the reference voltage value, the laser diode 6 is turned on, so that it emits a laser beam, resuming the write operation.

FIG. 12 is a flowchart illustrating the control operation performed within the optical disc apparatus 1c shown in FIG. 10 when it writes to the optical disc 2.

(1) First, the control circuit 20 starts its data write control operation at step S1201.

(2) At step S1202, the voltage difference detection section 21 of the control circuit 20 determines the value of the first voltage $V_{LDD}$ by subtracting the second voltage $V_{LD}$ from the power supply voltage $V_S$.

(3) At step S1203, the voltage comparing section 22 of the control circuit 20 compares the first voltage $V_{LDD}$ with a reference voltage $V_0$ to determine whether or not the first voltage $V_{LDD}$ exceeds the reference voltage $V_0$.

(4) If it is determined at step S1203 that the first voltage $V_{LDD}$ does not exceed the reference voltage $V_0$, at step S1204 the laser output on/off control signal generating section 24d of the control circuit 20 checks the signal output from the temperature sensor 40 and determines that the temperature of the laser diode 6 exceeds a reference value.

(5) Upon determining that the temperature of the laser diode 6 exceeds the reference value, the laser output on/off control signal generating section 24d generates and outputs a laser output on/off control signal (namely, a laser output turn-off signal) based on the output from the voltage comparing section 22 at step S1205.

(6) The laser output on/off control unit 19 controls the laser drive circuit 7 based on the laser output on/off control signal to turn off the output of the laser drive circuit 7 at step S1206, thereby stopping the data write operation on the optical disc 2.

(7) When a certain time has elapsed and the temperature of the laser diode 6 has fallen, the voltage comparing section 22 determines at step S1207 whether the first voltage $V_{LDD}$ for driving the laser drive circuit 7 has exceeded the reference voltage $V_0$.

(8) If it is determined at step S1207 that the first voltage $V_{LDD}$ has exceeded the reference voltage $V_0$, at step S1208 the laser output on/off control signal generating section 24d generates and outputs a laser output on/off control signal (for turning on the output of the laser drive circuit 7) based on the output from the voltage comparing section 22.

(9) At step S1209, the laser output on/off control unit 19 controls the laser drive circuit 7 based on the laser output on/off control signal to turn on the output of the laser drive circuit 7.

(10) As a result, the laser drive circuit 7 drives the laser diode 6 at step S1210, causing the laser diode 6 to resume its laser beam emission to write to the optical disc 2.

(11) If it is determined at step S1203 that the first voltage $V_{LDD}$ exceeds the reference voltage $V_0$, the control circuit 20 lets the write operation continue without causing the laser output on/off control signal generating section 24d to check for an increase in the temperature of the laser diode 6.

(12) Further, if it is determined at step S1207 that the first voltage $V_{LDD}$ has not exceeded the reference voltage $V_0$, the control circuit 20 still maintains the output of the laser drive circuit 7 in an off state and waits for the temperature of the laser diode 6 to further decrease. If the first voltage $V_{LDD}$ has not exceeded the reference voltage $V_0$ within a predetermined period of time, the control circuit 20 causes the optical disc apparatus to stop its write operation at step S1211, thus terminating the writing process abnormally.

It should be noted that the control circuit 20 automatically performs the above series of steps (S1201 to S1211) according to a program stored in memory means within the optical disc apparatus 1c, such as the memory 30.

Thus, the optical disc apparatus 1c of the third embodiment also has a low cost configuration and can reliably perform a write operation at high speed.

It should be further noted that the above control operations of the first and second embodiments may be modified as follows: after reducing the second voltage $V_{LD}$ and then writing to the optical disc (as in the above examples), the second voltage $V_{LD}$ is increased again and it is determined whether the first voltage $V_{LDD}$ exceeds the reference voltage; and if so, then data is written to the optical disc in this state without reducing the second voltage $V_{LD}$. Further, although in the above embodiments the memory 30 is provided separately from the control circuit 20, the present invention is not limited to this particular arrangement. The control circuit 20 may include the memory 30.

The present invention may be embodied in other specific forms without departing from the spirit or essential characteristics thereof. The described embodiments are therefore to be considered in all respects as illustrative and not restrictive. The scope of the invention is indicated by the appended claims rather than the foregoing description, and all changes which come within the meaning and range of equivalents thereof are intended to be embraced therein.

What is claimed is:

1. An optical disc apparatus for writing data to and/or reading data from an optical disc by irradiating said optical disc with a laser beam, said optical disc apparatus comprising:
    a spindle motor for rotating said optical disc;
    a laser diode for generating and emitting a laser beam for reading and writing operations;
    a laser drive circuit driven by a first voltage generated from an applied power supply voltage, said laser drive circuit generating a second voltage for driving said laser diode; and
    a control circuit for, when data is written to said optical disc, detecting the level of said first voltage, comparing said detected level of said first voltage with a reference value and determining whether or not said detected level of said first voltage exceeds said reference value, and, based on said detected level of said first voltage, controlling said second voltage to adjust said first voltage to a level within a predetermined range, wherein:
    when said first voltage does not exceed said reference value, said control circuit reduces said second voltage to a level such that said first voltage exceeds said reference value, and
    said laser drive circuit is driven by said adjusted first voltage, and said laser diode is driven by the controlled second voltage.

2. The optical disc apparatus as claimed in claim 1, wherein said control circuit detects said level of said first voltage by subtracting said second voltage from said power supply voltage.

3. The optical disc apparatus as claimed in claim 1, wherein:
    said control circuit includes a write speed control signal generating section for controlling data write speed; and
    when data is written to said optical disc, if said first voltage does not exceed a reference value, said control circuit reduces said data write speed by reducing the rotational speed of said spindle motor and hence reducing the rotational speed of said optical disc.

4. A method for writing data using an optical disc apparatus that writes data to and/or reads data from an optical disc by driving a laser diode by use of a laser drive circuit and irradiating said optical disc with a laser beam emitted from said laser diode, said method comprising:

a first step of detecting the level of a first voltage generated from an applied power supply voltage for driving said laser drive circuit;

a second step of comparing said detected level of said first voltage with a reference value and determining whether or not said detected level of said first voltage exceeds said reference value; and a third step of, based on the result of said determination in said second step, controlling a second voltage generated by said laser drive circuit for driving said laser diode to adjust said first voltage to a level within a predetermined range, wherein when, in said second step, that said detected level of said first voltage does not exceed said reference value is determined, in said third step, said second voltage is reduced to a level such that said first voltage exceeds said reference value.

* * * * *